Aug. 4, 1959 — E. R. GREEN — 2,898,009
APPARATUS FOR DISPENSING PASTES, CREAMS AND LIQUIDS
Filed Dec. 19, 1955 — 3 Sheets-Sheet 1

INVENTOR
EDWARD R. GREEN
BY
ATTORNEYS

Aug. 4, 1959        E. R. GREEN        2,898,009
APPARATUS FOR DISPENSING PASTES, CREAMS AND LIQUIDS
Filed Dec. 19, 1955        3 Sheets-Sheet 2
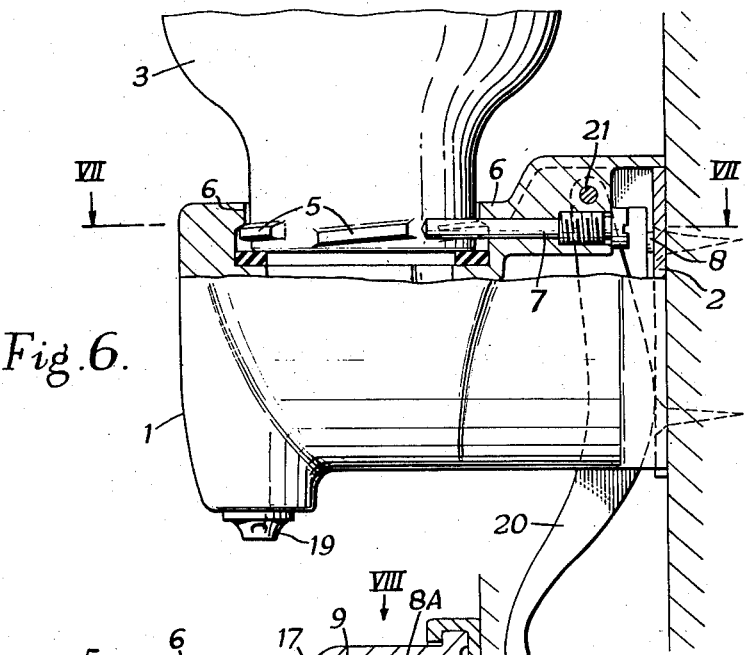
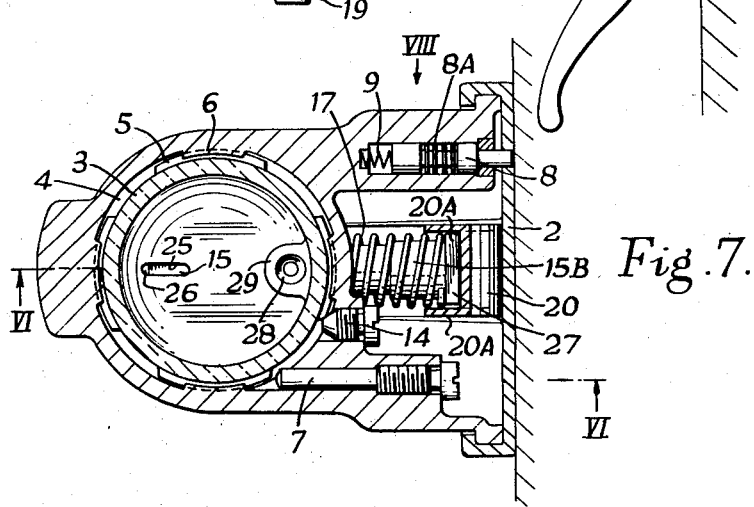
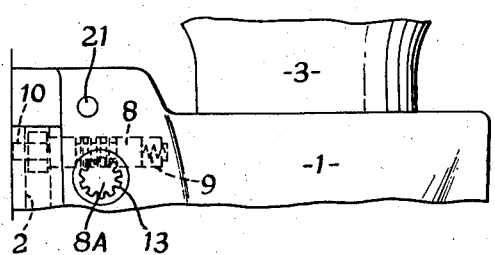
INVENTOR
EDWARD R. GREEN
BY
Wenderoth, Lind & Ponack
ATTORNEYS Aug. 4, 1959 E. R. GREEN 2,898,009
APPARATUS FOR DISPENSING PASTES, CREAMS AND LIQUIDS
Filed Dec. 19, 1955 3 Sheets-Sheet 3
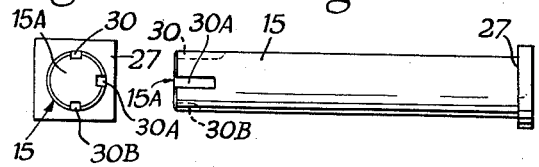
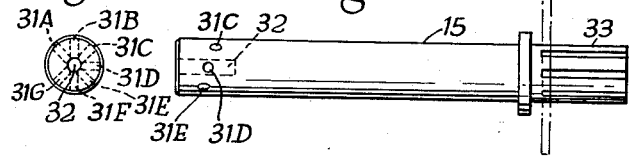
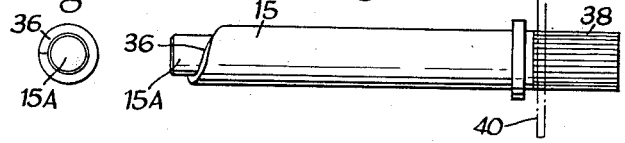
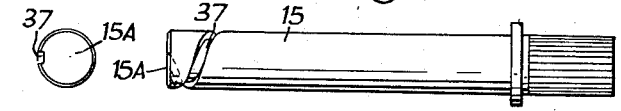
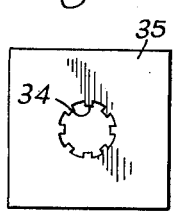
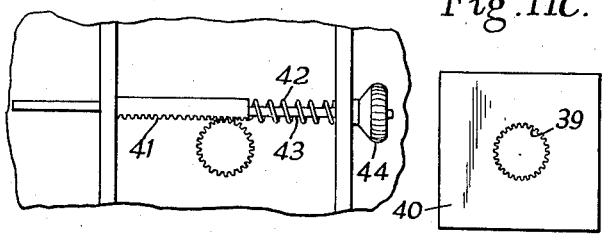
INVENTOR
EDWARD R. GREEN
BY
ATTORNEYS

United States Patent Office 2,898,009
Patented Aug. 4, 1959

2,898,009
APPARATUS FOR DISPENSING PASTES, CREAMS AND LIQUIDS

Edward Ramsay Green, Westminster, London, England, assignor to Newton, Chambers & Company Limited, Thorncliffe, England, a British company Application December 19, 1955, Serial No. 554,022

Claims priority, application Great Britain August 12, 1955

16 Claims. (Cl. 222—308)

This invention relates to apparatus for dispensing pastes, creams and liquids, particularly in the form of soaps and other detergents or toilet preparations, foods and other fluent substances, and has reference to apparatus of the kind in which a substance fed from a storage container to a cylinder is expelled therefrom in measured quantities by an exteriorly operable piston through a non-return delivery valve.

The object of the present invention is to provide improved charge-expelling mechanism for disponsing apparatus of the kind referred to.

More particularly it is an object of the present invention to provide a dispensing apparatus of reciprocating piston type in which the amount of substance delivered at each operation is variable by preadjustment by way of rotating the piston about its longitudinal axis.

By way of example, a number of embodiments of the invention will now be described with reference to the accompanying drawings, wherein:

Fig. 6 is a part sectional elevation of the dispenser, the section being taken on line VI—VI of Fig. 7.

Fig. 7 is a sectional plan on line VII—VII of Fig. 6.

Fig. 8 is a side view looking in the direction of arrow VIII, Fig. 7.

Figs. 9 and 9A, 10, 10A, 10B and 10C, 11, 11A, 11B and 11C, 12 and 12A and 13, illustrate alternative forms of pistons providing for different quantities of substance delivered as hereinafter more particularly described.

Figure 1:
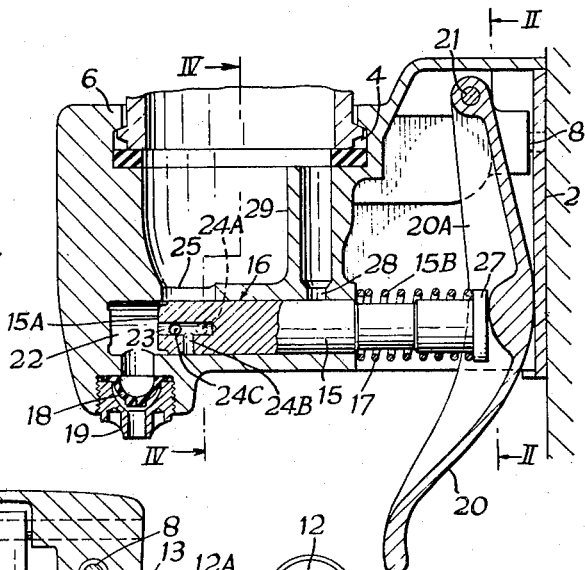
Fig. 1 is a part-sectional elevation of the main parts of a dispenser, showing a detachable storage container mounted in position, and incorporating means for selective adjustment of measured quantities dispensed.
Figures 2, 3:
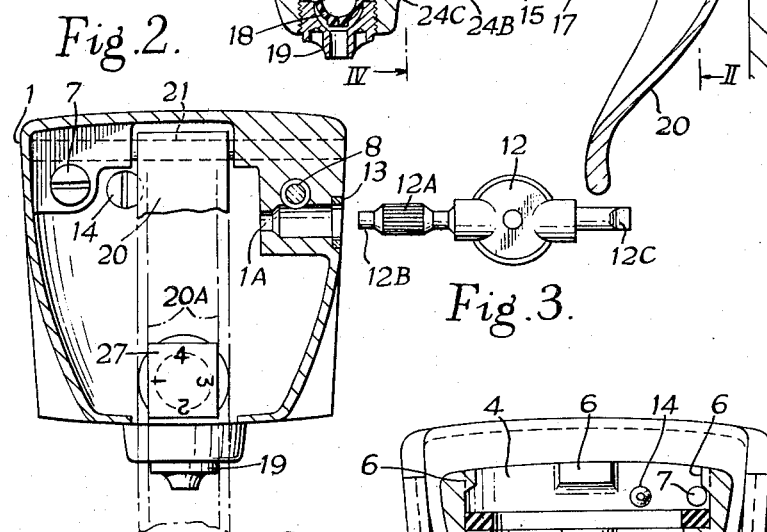
Fig. 2 is a cross section on line II—II of Fig. 1.
Fig. 3 is a detail view of a key, provided for a purpose hereinafter described and shown opposite the keyhole in Fig. 2 into which it is inserted.
Figure 5:
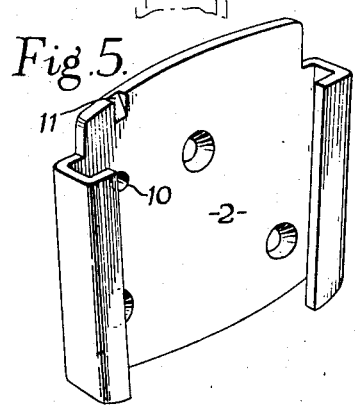
Fig. 5 is a detail view of a wall plate on which the dispenser body is mounted.
Figure 4:
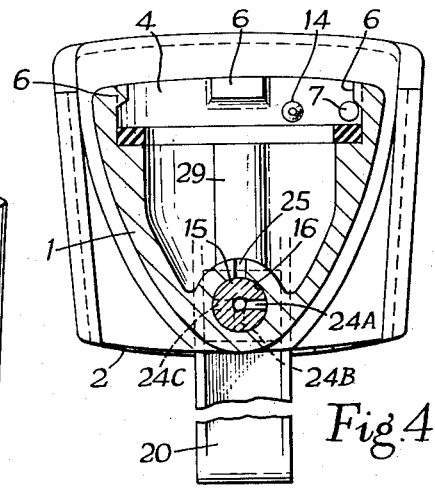
Fig. 4 is a cross section on line IV—IV of Fig. 1.

Figures 1 to 8 of the accompanying drawings illustrate a known construction of dispenser, that is, one comprising a dispenser body 1 slidably mounted on a wall bracket 2 and having mounted thereon in inverted position, a detachable container 3 for storing the paste or other fluent substance which is to be dispensed in measured quantities. The container 3 is secured in a socket 4 of the dispenser body 1 by co-acting lugs 5, 6 on the neck of container 3 and in the socket 4 respectively and is attached by removing the dispenser body 1 from the wall bracket 2, inverting the body 1 and placing it over the open mouth of a container, and relatively rotating the body 1 and container 3 to engage the lugs 5, 6. The lugs 5 or the lugs 6 may be inclined or both sets of lugs may be similarly inclined. The body 1 with the attached container 3 is then turned over bodily and mounted on wall bracket 2. The container 3 is retained on the dispenser body 1 by a screw 7 therein adapted to oppose an end face of a container lug 5 and thus prevent reverse rotation of the container, such as would serve to release it; the screw 7 is inaccessible when the dispenser body 1 is mounted on the wall bracket 2. The dispenser body 1 is locked to the wall bracket 2 by a bolt 8 biased outwardly by spring 9 so as to engage automatically a hole 10 in wall bracket 2, an inclined ramp 11 on the latter (see Fig. 5) facilitating temporary depression of bolt 8 as the dispenser body 1 is slid into position on wall bracket 2. The bolt 8 can be retracted by engaging a grooved portion 8A thereof with the fluted shank 12A of a key 12 (see Fig. 3) insertable through a complementary keyhole plug 13 securely fixed in the body 1 (see Fig. 8); the key 12 has a pilot end 12B engageable with a bearing hole 1A within the body 1 to support the key 12 and a flattened end 12C to serve as a driver for turning the container retaining screw 7.

In the construction shown the container lugs 5 are inclined and the socket lugs 6 are level, and to prevent the container lugs 5 being turned past the socket lugs 6 a stop screw 14 is provided; this stop screw 14 is not altered when a container 3 is mounted on or removed from the dispenser body 1, but the retainer screw 7 has to be screwed back clear of the container lugs 5.

The charge expelling mechanism comprises a piston 15 slidable in a cylinder 16, the piston 15 being biased out of the cylinder 16 by an encircling coil spring 17 which bears against the cylinder end. The piston 15 is adapted to be moved into the cylinder 16 to expel a measured quantity of soap paste or other fluent substance through a non-return delivery valve 18 (in the form of a self-sealing rubber nipple) supported in a screw-in nozzle 19, by pulling upon a lever handle 20 suspended on a pivot pin 21.

It is a feature of the present embodiment that the slidable piston 15 has a fixed stroke and functions to trap a constant supply of soap paste or other fluent substance in the space 22 in front of the piston 15 at the commencement of the inward stroke of the piston, so that movement of the piston 15 into the cylinder 16 displaces, and discharges through the non-return delivery valve 18, a predetermined measured quantity of the substance. This measured quantity is governed by the amount, if any, of the substance which can pass back through or around the cylinder, as hereinafter more particularly described.

The embodiment of the invention illustrated in Figures 1 to 8 of the accompanying drawings is adapted for adjustment to deliver four different measured quantities of soap paste or other fluent substance and for this purpose the piston 15 has a varying cross sectional area, the cross sectional area of the end adjacent the delivery valve 18 being reduced by a passageway 23 extending axially inward from the inner end face 15A adjacent delivery valve 18, and communicating with this passageway 23 are three longitudinally spaced passageways 24A, 24B, 24C, these passageways opening out of the circumferential surface of piston 15 at varying distances along said piston. The passageways are also equidistantly radially spaced, that is, at 90° one to the other. It will be noted that between any one of the positions of the passageways 24A, 24B and 24C and the end face 15A the cross sectional area of the piston 15 is reduced by an amount equal to the cross section area of the passageway 23.

The container feed orifice is in the form of an inlet port 25 which is located at the top of the cylinder 16 and is elongated in shape and of such a length as to extend longitudinally from passageway 24A to a point just beyond the end face 15A of the piston. The three radial passageways 24A, 24B and 24C, provide for three different measured quantities. The fourth measured quantity is provided for by the amount of substance passing directly to the space 22 in front of the piston 15. A square flange 27 is provided at the opposite end of piston 15 and on the face of the flange are engraved position numbers "1," "2," "3" corresponding respectively to radial passageways 24A, 24B, 24C; position number "4" corresponds to that at which substance flows through inlet port 25 directly to the space 22 in front of the piston 15.

If desired four radial passageways may be provided, corresponding to the position numbers "1," "2," "3" and "4"; in this case the front end of the piston 15 does not align with inlet port 25, so that the substance cannot pass directly to the space 22 in front of the piston.

By rotating the piston 15 about its own longitudinal axis any one of these three radial passageways 24A, 24B, 24C can be brought uppermost and the piston 15 is held in the adjusted position by the side checks 20A of the operating lever handle 20 which embrace or flank the square flange 27 provided at the back end of the piston 15. Thus whichever radial hole is uppermost will be open to the inlet port 25 when the piston 15 is retracted by the action of spring 17. Since the radial passageways 24A, 24B, 24C are provided at different distances from the end face 15A of the piston 15 they will cease communication with the inlet port 25 at different times during the inward stroke of the piston 15, according to whether the selected radial passageway is further or nearer to the piston end face 15A. If the front end of the piston 15 is being employed for quantity control, the piston 15 will have to be retracted the full extent of its stroke before the piston end 15A aligns with the inlet port 25, and this is normally effected by the action of spring 17. Hence the piston will only have to move forward a small distance before direct access to the space 22 is closed, and thus an amount of substance is trapped in the space 22 which gives maximum discharge.

If one of the three radial passageways is set uppermost, the selected passageway 24A, 24B or 24C will align with the inlet port 25 before the piston 15 has fully retracted, but since port 25 is elongated the selected piston passageway remains in communication with the storage container 3 during the remainder of the backward stroke of the piston 15. Thus on the inward stroke some of the substance trapped in the cylinder space 22 flows back through inlet port 25 until the radial passageway aligned with inlet port 25 has been disaligned therewith as the piston moves forward, thus providing for discharge of lesser amounts according to which radial passageway is selected.

To alter the setting for quantity discharged, the dispenser body 1 is removed from its wall bracket 2, thus permitting the lever handle 20 to be swung back clear of the piston 15. This permits the piston 15 to be rotated into any one of the positions indicated by the numbers 1, 2, 3, 4, engraved on the square flange 27. It is convenient to let ascending numbers correspond to increasing discharge, and to indicate the appropriate setting by the uppermost number, as has been done in the preceding description.

During retraction of the piston a vacuum is formed in space 22 thus drawing the substance into the space much more rapidly than would occur with gravitational flow, and owing to this rapid inward flow the dimensions of the passageways can be kept small thus increasing the leakage path and hence the volumetric efficiency.

A further improvement to the mechanism comprises the provision of a separate port 28 for the ingress of air to the storage container 3. This port 28 is preferably separated from the inlet port 25 by a barrier 29. The piston 15 is slightly waisted at 15B, that is, from the point where it projects from the cylinder 16 so that when in the forward position air can pass freely from atmosphere to the air port 28 via the space around piston waist 15B, the air being induced by the fall in pressure in the storage container 3 as the substance is expelled.

Without this separate port 28 air would have to creep along the exterior surface of the piston 15 and enter the container 3 through inlet port 25 namely, the same port as used for the passage of substance from the container 3 to the cylinder 16. Since the clearance between piston 15 and cylinder 16 must necessarily be small, the air would have a very restricted passage to the port 25 and so could not enter the container 3 as quickly as the substance was expelled, especially when the lever handle 20 was worked rapidly. In consequence the pressure in the container 3 would continue to fall so long as pumping continued, and thus restrict and eventually stop the discharge. A period of recovery would then be required before pumping again became normal.

A further advantage of the separate air port arrangement arises if a fluid of high viscosity is used in the dispenser. Due to this high viscosity a bubble of air, after passing through the inlet port 25 would rise very slowly through the viscous fluid, and it has been found in some cases that unless this bubble is at least half an inch above the port 25 by the time the piston 15 is next operated, the bubble of air will be drawn into the cylinder 16 in preference to the fluid. By providing a separate port 28 for the air and placing a barrier 29 at least half an inch high between this and the inlet port 25 this trouble does not arise.

Figures 9 to 13 inclusive illustrate various other arrangements for delivering different measured quantities by rotation of the piston 15 about its own longitudinal axis. Figures 9 and 9A for instance show an alternative form of piston adapted for delivering four different measured quantities and in which the piston has a varying cross sectional area, the cross sectional area of the end of the piston adjacent the delivery valve being reduced by three longitudinal surface passageways or grooves 30, 30A and 30B extending in from the piston end face 15A to positions that are at varying distances along the piston from end face 15A. It will be noted that between any one of the positions of the ends of the grooves 30, 30A and 30B which are remote from the end face 15A the cross sectional area of the piston 15 is reduced by at least the cross sectional area of one of the grooves. The maximum quantity dispensed, as in the case of the radial passageways shown in Figure 1, is that which is trapped when the front end of the piston 15 passes forward beyond the inlet port 25 and none of the surface passageways aligns with the inlet port 25; the four rotational positions of the piston to provide four different measured quantities are determined by the square flange 27.

Figures 10, 10A, 10B and 10C inclusive illustrate another radial passageway arrangement; in this case eight different quantities are provided for, the maximum quantity again being that trapped when the front end of the piston 15 cuts off communication with the inlet port 25. Decreasing quantities are determined by seven radial passageways 31A, . . . 31G all communicating with a common axial passageway 32. The piston 15 is secured in the required selected position by causing the splined end 33 to engage a complementary splined opening 34 in a fixing plate 35.

Figures 11, 11A and 11B illustrate a piston 15 provided with a face 36 of helical form which commences at the end face 15A and each point of which is at a different distance from the end face 15A. The piston is of varying cross section, the portion of the piston between the helically extending face 36 and the end face 15A being a cylinder having a uniform diameter which is less than the diameter of the remainder of the piston. It will be seen that between any one of the points along the face 36 and the end 15A the cross sectional area of the piston 15 is reduced to the cross sectional area of the portion having the smaller diameter. Figures 12 and 12A illustrate a modification in which use is made of a helical groove 37, which also commences at the end face 15A and extending along the peripheral surface of the piston. Each point of the wall of the helical groove which is the farthest away from end face 15A is at a different distance from the end face. The piston is of varying cross section, the portion between any point on said wall of the helical groove 37 and the end face 15A being reduced by an amount equal to the cross sectional area of the groove, i.e. the cross section at any point between said wall of the groove and the end face 15A will be less than the cross sectional area of the entire piston by an amount equal to the cross sectional area of the groove. In both of these arrangements a large number of different quantities, or infinitely variable quantities of the substance may be dispensed (within the range of adjustment determined by the longitudinal length of the shoulder 36 or groove 37) by rotation of the piston. Finely graduated quantities may be obtained by securing the rotated piston 15 by engagement of the finely splined or toothed end 38 of the piston with the complementarily splined opening 39 of a fixing plate 40. Alternatively, the splined or toothed end 38 may be used for imparting rotation to the piston to give infinitely varying quantities, the end 38 being engaged by a toothed rack 41, which is normally biased by a coil spring 42 in one direction and adjustably held in the opposite direction, for instance by movement of a screwthreaded spindle 43 obtained by turning of a nut 44.

I claim:

1. Apparatus for dispensing measured quantities of a fluent substance, comprising a body having a cylinder and a feed orifice leading to said cylinder, a storage container for said fluent substance mounted on said body in direct communication with said feed orifice, a non return delivery valve in said cylinder, an exteriorly operable slidable piston in said cylinder functioning as a cut-off valve when moved inwards, inward movement of the piston displacing a predetermined amount of substance from a trapping space in front of said piston through said non-return delivery valve, and means to rotate said piston about its longitudinal axis to vary the quantity of fluent substance delivered at each stroke of said piston.

2. Dispensing apparatus as claimed in claim 1 wherein the piston has at least one passageway leading to the front face thereof, endwise displacement of the piston moving the entrance to the piston passageway out of alignment with the feed orifice in said cylinder and trapping in front of the piston a predetermined amount of substance which is expelled by said piston.

3. Dispensing apparatus as claimed in claim 1 wherein means are provided for passing a fixed amount of substance to the space in front of the piston at the commencement of its stroke and the quantity expelled by the piston is governed by predetermining the position during the piston stroke at which return of the substance to the storage container via said feed orifice ceases.

4. Dispensing apparatus as claimed in claim 1, wherein the rotatable piston is formed at its outer end in such manner that the longitudinal position of the piston is varied at which during its stroke communication ceases between said feed orifice and the substance-trapping space in front of the piston, thereby altering the amount of substance which can flow back into the storage container during inward piston movement before said communication ceases.

5. Dispensing apparatus as claimed in claim 4, characterized in that measuring of the charge to be expelled is effected by the front end of the piston which is of helical form.

6. Apparatus for dispensing a fluent substance, comprising a body having a cylinder and an elongated feed orifice communicating with said cylinder, a storage container on said body feeding fluent substance to said cylinder via said elongated feed orifice, a non-return delivery valve on said cylinder, and an exteriorly operable piston slidable in said cylinder and rotatable about its longitudinal axis, said piston having a plurality of passageways leading to the front face of said piston and terminating at different longitudinal positions along the piston within the length of said elongated feed orifice, whereby any one of said passageways can by rotation of the piston be selectively brought into alignment with said feed orifice.

7. Dispensing apparatus as claimed in claim 6, wherein at least two radial passageways extend in different directions from a common axial passageway leading to the front face of the piston, alignment of a selected radial passageway with the container feed orifice being effected by rotating the piston about its longitudinal axis.

8. Dispensing apparatus as claimed in claim 7, wherein when the piston is fully retracted fluent substance can flow directly over the front end thereof, the largest amount of substance dispensed being that which flows directly to the space in front of the piston and decreasing amounts being provided through the use of a radial passageway.

9. Dispensing apparatus as claimed in claim 6, wherein the piston is held in a rotational adjusted position by flat surfaces on the piston co-operating with locating faces on an operating lever.

10. Dispensing apparatus as claimed in claim 1, wherein the piston has a single surface passageway extending in from the front face of the piston.

11. Apparatus for dispensing measured quantities of a fluent substance, comprising a body having a cylinder and an elongated feed orifice leading into said cylinder, a storage container for said fluent substance mounted on said body in direct communication with said feed orifice, a non-return delivery valve in said cylinder, an exteriorly operable slidable piston in said cylinder, said piston being rotatable about its longitudinal axis and having a varying cross sectional area, said piston having the cross sectional area thereof reduced between the end thereof adjacent said delivery valve and a plurality of positions on the circumferential surface of the piston, said positions being at varying distances along said piston from said end adjacent said delivery valve, the elongation of said feed orifice being from the position of said plurality of positions nearest said end of said piston to the position farthest from said end of said piston, said piston functioning as a cut-off valve when moved inwardly, inward movement of the piston dispensing the substance from in front of said piston through said non-return delivery valve.

12. Apparatus as claimed in claim 11 in which the end of said piston has a helically extending face, the plurality of positions being along said face, the portion of said piston between said helically extending face and said end being a cylinder having a uniform diameter less than the diameter of the remainder of said piston.

13. Apparatus as claimed in claim 11 in which the end of said piston has a helical groove in the circumferential surface thereof extending in from the end of said piston adjacent said delivery valve, the cross sectional area of said piston being reduced between the wall of said helical groove farthest from said end of said piston and said end of said piston by an amount equal to the cross sectional area of said groove.

14. Apparatus as claimed in claim 11 in which said piston has a plurality of grooves in the surface thereof extending along said piston parallel to the axis thereof from said end and terminating at different distances from said end.

15. Apparatus as claimed in claim 11, wherein said piston has an axial passageway extending in from its front face and a series of ports spaced longitudinally along said piston and radiating from said axial passageway in different directions and wherein said feed orifice has a dimension in the direction of the stroke of the slidable piston not less than the overall longitudinal dimension of the spaced radial ports.

16. Apparatus for dispensing a fluent detergent substance comprising a body having a horizontal cylinder and a feed orifice communicating therewith, a non-return delivery valve on the underside of said cylinder, a storage container on said body and gravity feeding a fluent substance to said feed orifice, a piston slidable in said cylinder and securable in any one of a plurality of angularly displaceable positions by rotation of said piston about its longitudinal axis, and an exteriorly accessible swinging handle operable by a pulling action imparted thereto by a hand having its palm upturned to receive a charge of fluent substance issuing from said delivery valve, said piston having an axial passage leading to the front face thereof and a plurality of ports radiating in different directions and communicating with said axial passage, the number of radial ports equalling the number of angularly displaceable positions in which said piston is adjustable and selective positioning of said piston by rotation about its longitudinal axis determining the extent of piston stroke performed before the feed orifice is obstructed.

References Cited in the file of this patent

UNITED STATES PATENTS

| | | |
|---|---|---|
| 2,322,866 | Merz | June 29, 1943 |
| 2,605,021 | Churchill et al. | July 29, 1952 |